(12) United States Patent
Chandramouli et al.

(10) Patent No.: US 10,445,728 B2
(45) Date of Patent: Oct. 15, 2019

(54) COMPUTER IMPLEMENTED SYSTEMS AND METHODS FOR SECURE DATA TRANSACTIONS ACROSS DISPARATE COMPUTING NETWORKS

(71) Applicant: Ariba, Inc., Sunnyvale, CA (US)

(72) Inventors: Vijay Chandramouli, San Jose, CA (US); Xiangqun Hu, Palo Alto, CA (US); Yuan Tung, Fremont, CA (US); Chris Chase, Palo Alto, CA (US); Kshitij Dayal, Los Altos, CA (US)

(73) Assignee: Ariba, Inc., Sunnyvale, CA (US)

( * ) Notice: Subject to any disclaimer, the term of this patent is extended or adjusted under 35 U.S.C. 154(b) by 846 days.

(21) Appl. No.: 14/982,573

(22) Filed: Dec. 29, 2015

(65) Prior Publication Data
US 2017/0187693 A1 Jun. 29, 2017

(51) Int. Cl.
*G06Q 40/02* (2012.01)
*G06Q 20/38* (2012.01)
*H04L 29/06* (2006.01)

(52) U.S. Cl.
CPC ........... *G06Q 20/382* (2013.01); *G06Q 40/02* (2013.01); *H04L 63/10* (2013.01); *H04L 63/20* (2013.01)

(58) Field of Classification Search
CPC ...... G06Q 20/382; G06Q 40/02; H04L 63/10; H04L 63/20
USPC .......................................................... 705/50
See application file for complete search history.

(56) References Cited

U.S. PATENT DOCUMENTS

| | | | |
|---|---|---|---|
| 2005/0096126 A1* | 5/2005 | Prasad | G07F 17/32 463/25 |
| 2015/0154588 A1* | 6/2015 | Purves | G06Q 20/363 705/14.27 |
| 2016/0092474 A1* | 3/2016 | Stojanovic | G06F 3/04842 707/805 |
| 2017/0180454 A1* | 6/2017 | Sharma | H04L 67/22 |

* cited by examiner

*Primary Examiner* — James D Nigh
(74) *Attorney, Agent, or Firm* — Fountainhead Law Group P.C.

(57) ABSTRACT

In one embodiment, a local computer network includes profile information local identifications for multiple organizations. Remote profile information is stored on a remote computer network and transferred to the local network to perform secure transactions with other computer networks. Embodiments of the disclosure include linking remote and local identifications. In another embodiment, remote and local identifications are linked by generated multiple messages to different users in different roles to prevent fraud, for example.

20 Claims, 6 Drawing Sheets

COMPUTER IMPLEMENTED SYSTEMS AND METHODS FOR SECURE DATA TRANSACTIONS ACROSS DISPARATE COMPUTING NETWORKS

CROSS REFERENCE TO RELATED APPLICATIONS

The present application contains subject matter related to the subject matter in the following concurrently filed patent application: U.S. patent application Ser. No. 14/982,517, entitled "Computer Implemented Systems and Methods for Fraud Prevention in Data Transactions Across Disparate Computing Networks."

BACKGROUND

The present disclosure relates to computing and secure data processing, and in particular, to computer implemented systems and methods for performing data transactions across disparate computing networks.

The growth of computing has led to a wide range of computing systems being customized and tailored for particular applications. Users of such systems may have accounts and data on multiple different computer networks for performing a wide range of applications. While some integration between systems is possible, security and fraud prevention is an important issue facing both computer users and system developers.

For example, multiple parties may desire to perform various data transactions. However, each party may have different aspects of their data spread out across multiple different computer networks. As but one example, a financial transaction between a buyer and a seller may involve sales data on one computer network, a buyer's bank account data on another computer network, and a seller's bank account data on yet another computer network. Orchestrating a secure, fraud resilient data transaction involving data from multiple parties in such an environment can be challenging.

Accordingly, performing data transactions across disparate computer networks is a technical computing problem in need of a solution.

SUMMARY

The present disclosure pertains to systems and methods for performing data transactions across disparate computer networks. In one embodiment, a local computer network includes profile information local identifications for multiple organizations. Remote profile information is stored on a remote computer network and transferred to the local network to perform secure transactions with other computer networks. Embodiments of the disclosure include linking remote and local identifications. In another embodiment, remote and local identifications are linked by generated multiple messages to different users in different roles to prevent fraud, for example.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
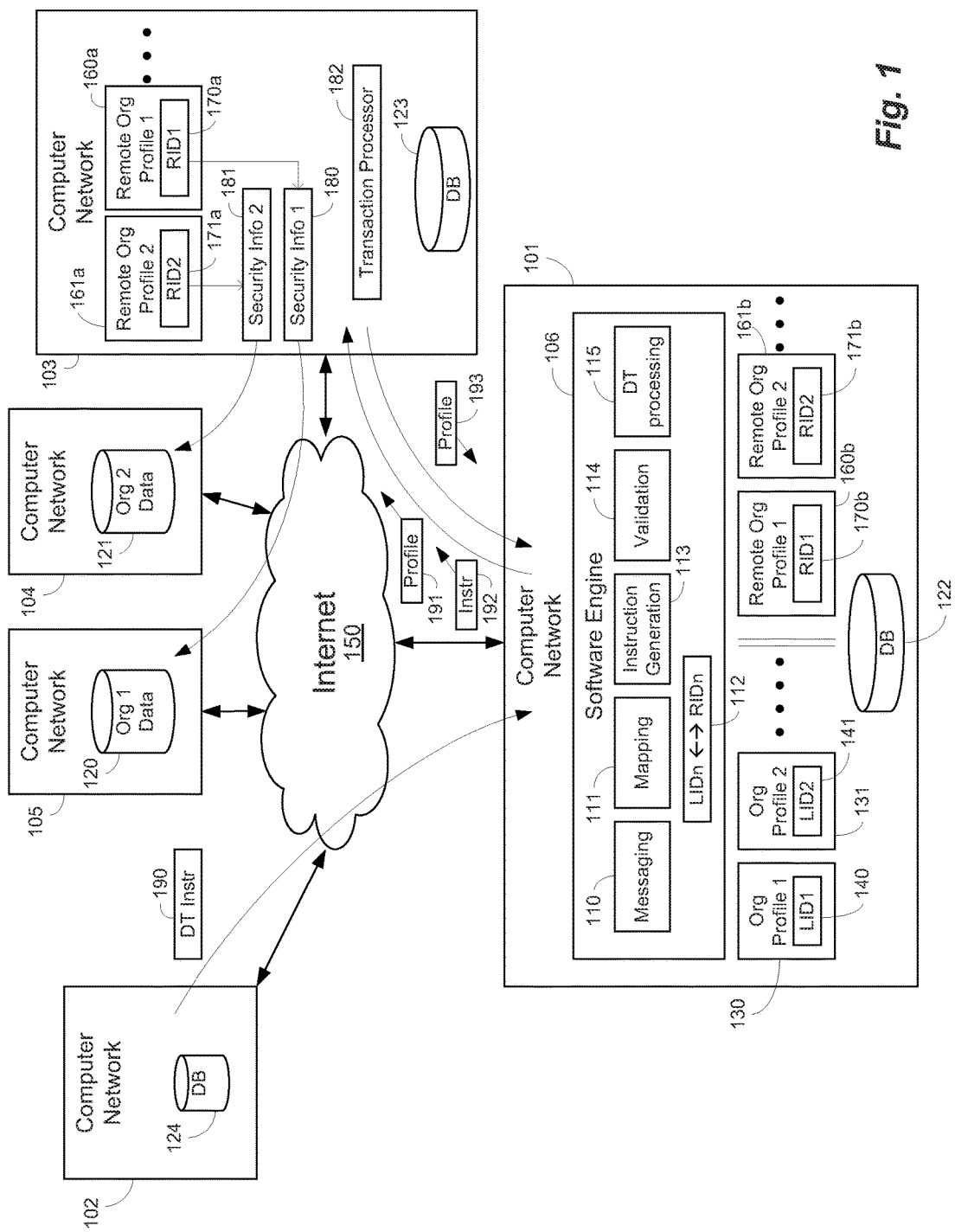
FIG. 1 illustrates a technology architecture for performing data transactions across disparate computer networks according to one embodiment.

FIG. 1 illustrates a technology architecture for performing data transactions across disparate computer networks according to one embodiment. Embodiments of the present disclosure may be used to perform secure and/or fraud preventative data transactions across disparate computer networks 101-105. As used herein, the term computer network refers to computer software systems executing on one or more computers. Computer networks may include one or more programs stored on a non-transitory machine-readable medium that is executable by at least one processing unit of a device, the program comprising sets of instructions for performing the techniques described herein. The computer networks described herein may support a wide range of functions by multiple users, for example, and particular computer networks are often customized to perform a specific range of functions for multiple users, such as enterprise resource planning (ERP), banking, or financial processing and the like. A specific example application is shown below in the context of a data transaction between a buyer and seller.

Features and advantages of the present disclosure include a computer network that acts as an intermediary between multiple parties to enable secure and/or fraud resilient operations on data. As illustrated in FIG. 1, a first user may be an employee of a first organization who may desire to perform a data transaction involving sensitive and secure data of another organization. In one example application, the first organization is a buyer and the other organization is a supplier. However, it is to be understood that other organizational relationships may benefit from the present disclosure. The first user may be working on computer network 102 (e.g., the buyer's enterprise resource planning (ERP) system) and define or otherwise request a data transfer instruction that operates on another organizations data. For example, a buyer may specify payments to be transferred from the buyers banking computer network to the sellers banking computer network. Accordingly, computer network 102 may generate data transfer instruction (DT Instr) 190 and send it to another computer network 101 (e.g., through the Internet). In some embodiments described in more detail below, computer network 101 may be a cloud computer network accessible by multiple users over the Internet and include servers, virtual machines, virtual networks, and/or web services for executing software for implementing the functions described herein in connection with computer network 101, for example.

Computer network 101 may comprise computers executing a software engine 106, which may be implemented as a software platform for executing multiple microservices (or "Apps) each performing a specific set of functions, such as data processing or validation, for example. Software engine 106 illustrates functional features including validation 114, data transfer instruction processing 115, messaging 110, mapping 111, and instruction generation 113, and may include other functions further aspects of which are described in more detail below. One example implementation of computer network 101 may be a commerce network that allows multiple buyers and sellers to log in and perform a wide variety of transactions, including submission and payment of invoices, for example.

In order to process data involving multiple parties on disparate computer networks, particular embodiments may include a remote computer network 103 that stores (e.g., in database 123) security information, profile information for multiple organizations, and (remote) identifications for each organization. Remote computer network 103 may provide an extra layer of security between computer network 101, which may be tailored for processing data transactions, and computer networks 104 and 105, which may be the sources and targets of the data transactions and which may store highly sensitive data requiring the highest levels of security possible. In one example embodiment, remote computer network 103 is a card network, such as a computer network operated by Discover, Visa, MasterCard, American Express, or the like, which may be customized for performing secure data transactions between buyers and suppliers on a banking computer networks, such as networks 104 and 105, for example.

Before a first user of a first organization may send a data transaction from computer network 102 to computer network 101, embodiments of the disclosure may include the first user of the first organization creating and storing an organization profile 130 for the first organization on computer network 101. In one embodiment, the first organization is assigned a first local identification (LID1) 140 (e.g., a buyer's ID), and LID1 140 may be stored in association with the first organization (e.g., associated with profile 130 in the same table in database 122). In one embodiment, the first user of the first organization may also enter a number of other parties (e.g., organizations, such as suppliers) with whom the first user desires to perform data transactions, thereby initiating the creation of organization profile 131 for a second organization and other organizations, for example. In the buyer-supplier example, there may be only a few large buyers, but many suppliers. Thus, the buyer may initiate on-boarding of the suppliers by entering their initial information into computer network 101, for example. Similar to the local IDs for the initiating organization, other organizations may be assigned local identifications, such as a second local identification (LID2) 141 (e.g., a supplier's ID), and LID2 141 may be stored in association with the second organization (e.g., associated with profile 131 in the same table).

The first user of the first organization (or another user from the first organization) may further separately log into computer network 103 (e.g., a card network) and create and store a remote organization profile 160a for the first organization comprising more sensitive information on computer network 103. The remote organization profile 160a on computer network 103 may comprise some of the same (overlapping) information as the organization profile 130 on computer network 101 (e.g., organization name, address, etc. . . . ). Conversely, remote organization profile 160a on computer network 103 may comprise unique (non-overlapping) information different than the organization profile 130 on computer network 101 (e.g., sensitive transaction numbers, security information for accessing secure data 120 in computer network 105, such as a buyer's bank account). Profile 160a may be assigned a remote identification (RID1) 170a by computer network 103. In the example of a buyer/supplier, the remote identification may be a proxy ID for the buyer, for example. Additionally, organization profile 160a may be linked or associated with security information 180 (also referred to as secure access information) that may be used to access the first organization's data 120 in a secure computer network 105, for example.

In one embodiment, a second user from the second organization may separately log into computer network 103 and create and store a remote organization profile 161a for the second organization comprising more sensitive information on computer network 103. In some embodiments, computer network 101 may automatically send the profile information 131 for the second organization (e.g., the supplier) from computer network 101 to computer network 103 to facilitate generation of a remote organization profile 161a, for example. This is illustrated in FIG. 1 as profile 191, for example. In this case, the second user from the second organization may supplement an existing profile, for example. The remote organization profile 161a for the second organization on computer network 103 may comprise some of the same (overlapping) information as the organization profile 131 (e.g., entered by the buyer) on computer network 101 (e.g., organization name, address, etc. . . . ). Conversely, remote organization profile 161a on computer network 103 may comprise unique (non-overlapping) information different than the organization profile 131 on computer network 101. For example, remote profile 161a may include sensitive transaction numbers, security information for accessing secure data 121 in computer network 104, and the names and messaging information for two individuals from the second organization who can assume different roles of "requestor" and "approver" as described further below.

Figure 2:
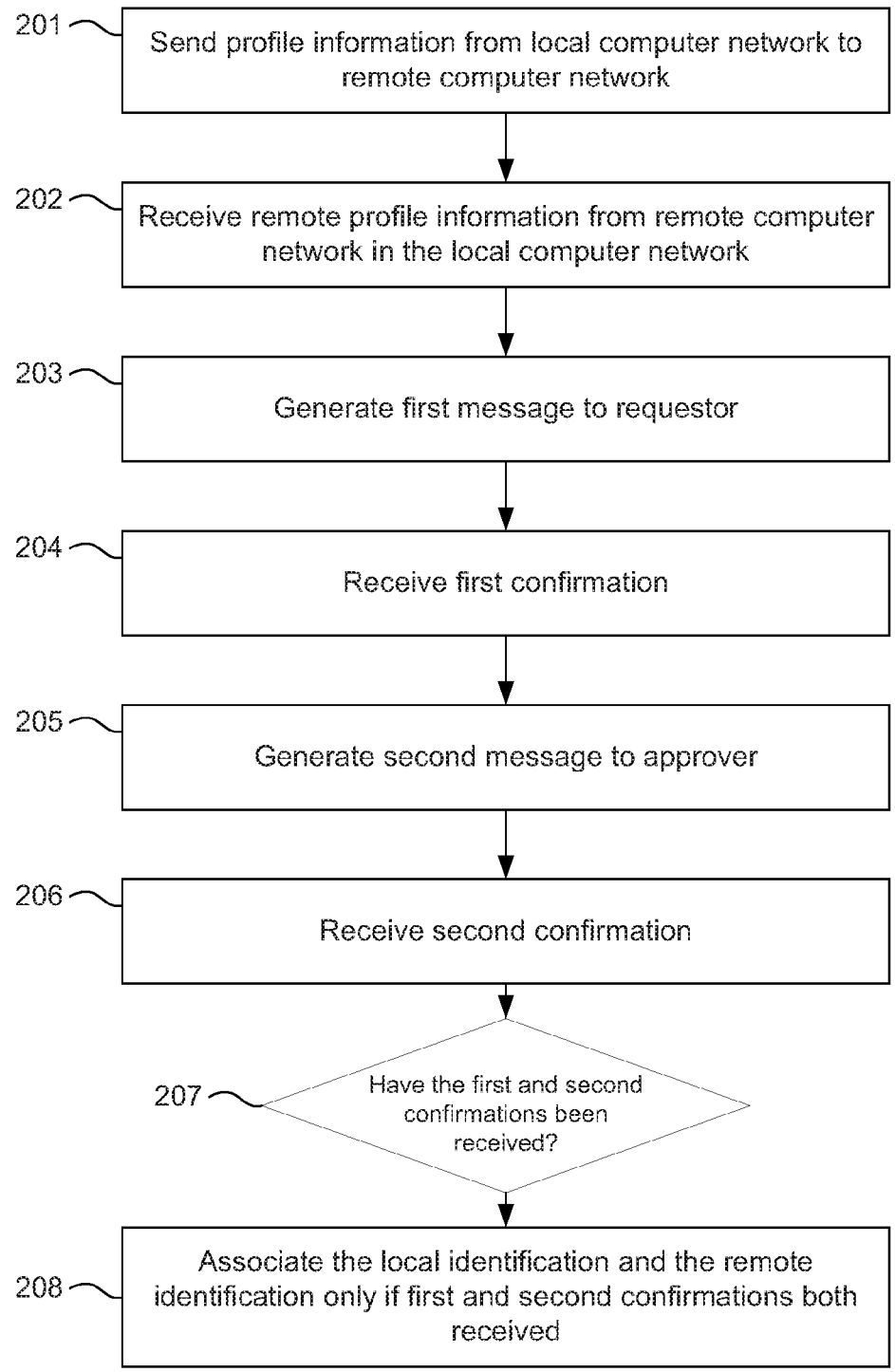
FIG. 2 illustrates a method for fraud prevention according to an embodiment.

FIG. 2 illustrates a method for fraud prevention according to an embodiment. The present method may be used for "on-boarding" the second organization, such as (e.g., suppliers) to securely execute a data transaction with the organization initiating the transaction (e.g., buyers from computer network 102), for example. The following process is carried out on local computer network 101 operating on one or more computers. At 201, profile information 131 corresponding to the organization is sent from the local computer network 101 to remote computer network 103. Such information may be use, for example, to establish contact with the organization and obtain supplemental sensitive information for accessing the organizations data, for example. At some point, remote computer network 103 may send remote profile information 161b back to computer network 101. Accordingly, at 202, remote profile information 161b is received from remote computer network 103. Remote profile information 161b may be a local copy on computer network 101 of remote profile information 161a stored on remote computer network 103, for example. Profile information 161b may include a remote identification (RID2) 171b, a partial transaction number (e.g., a partial account number), a designation of a first user having a first role (e.g., a requestor), first messaging information for the first user (e.g., a first email address), a designation of a second user having a second role (e.g., an approver), and second messaging information for the second user (e.g., a second email address). Profile information 161b may further include a name and address of the organization, for example. In some embodiments, profile information 161b may be stored on local computer network 101 separately from profile information 131. Profile information 131 may be exposed, or otherwise accessible, to users of computer network 101. However, profile information 161b and RID2 may include sensitive, security related information that is not exposed to users of local computer network 101 to maintain the security of the data transaction.

Features and advantages of the present disclosure include a multistep confirmation of approval process including multiple users from one of the organizations having different defined roles to prevent fraudulent data transactions. Computer network 101 may be an open network with a large number of users, and some users may have multiple accounts. In such an environment, it may be advantageous to have a mechanism to protect against fraudulent transactions, for example. In one embodiment, at 203, a first message is generated to the first user having the first role (requestor) using the first messaging information. The first message may include at least a portion of the profile information 131 (e.g., name and address), the local identification 141 (e.g., LID2), and at least a portion of the locally stored remote profile information 161b and the corresponding remote identification 171b (RID2). The user in the requestor role may receive the message and confirm (e.g., with an embedded link) that profile 131 stored on computer network 101 corresponds with profile 161a stored on computer network 103. Accordingly, a first confirmation may be received at 204 approving an association between LID2 141 and RID2 171b.

At 205, a second message is sent to the second user having the second role (approver) using the second messaging information. The second message may include the portion of the first profile information 131 and the local identification 141 (e.g., LID2), and the locally stored remote profile information 161b and the corresponding remote identification 171b (RID2). The user in the approver role may receive the message and confirm (e.g., with another embedded link) that profile 131 stored on computer network 101 corresponds with profile 161a stored on computer network 103. Accordingly, a second confirmation may be received at 206 approving an association between LID2 141 and RID2 171b.

At 207, the computer network 101 determines if the first confirmation and the second confirmation have been received. If so, the local identification (LID2) 141 and the remote identification (RID2) 171b are associated at 208 only if the first confirmation and the second confirmation have been received.

Figure 3:
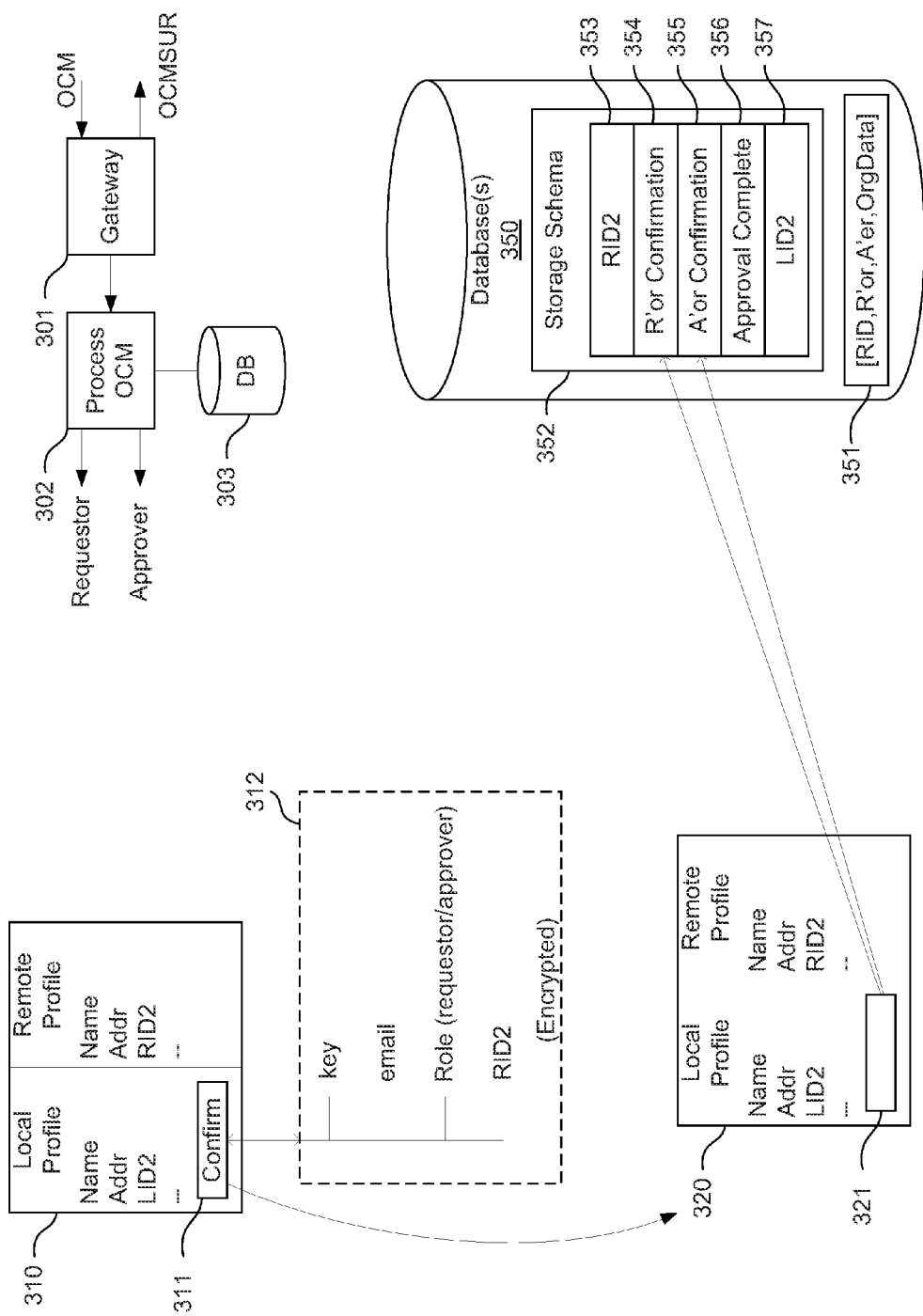
FIG. 3 illustrates an example technique for linking remote identifications and local identifications using a messaging system according to an embodiment.

FIG. 3 illustrates an example technique for linking remote identifications and local identifications using a messaging system according to an embodiment. In this example, a remote identification and profile information (e.g., profile 193 in FIG. 1) about one of the organizations, for example, is received in the local computer network 101 from the remote computer network 103 as an organization change message (OCM). A gateway software component 301 validates the content of the OCM. If the OCM does not have the minimum data requirements (e.g., RID2, requestor information, approver information, and a partial transaction number, etc. . . . ), then gateway 301 may generate and send a status update request (OCMSUR) to the remote computer network 103 to obtain the missing information. If the OCM is validated, then it is forwarded to an OCM processor 302. OCM processor 302 stores the data locally (e.g., in database 303). Embodiments of the local computer network 101 may include one or more databases 350. A schema for storing the OCM is shown at 351, where data from the OCM may be stored as records in a table that includes a field for the RID, requestor ("R'or"), approver ("A'er"), and other remote organization data, for example.

In response to receiving a valid OCM with organization data (e.g., about a supplier), the software engine 106 of FIG. 1 may sequentially generate messages, such as email; first for the requestor, and then for the approver. The system may retrieve local profile information and LID2, and embed such information together with remote profile information and RID2 from the OCM in the message so the requestor (and later the approver) can confirm that the particular local and remote information is properly linked. An example of an email generated and sent to the requestor is shown at 310. The message may include a portion of the overlapping local and remote profile information (e.g., name, address, etc. . . . ), LID2, RID2, and other information, for example, to allow the requestor to confirm that a particular local profile and LID2 should be linked to a particular remote profile and RID2. The messages may include a confirmation button 311 (or other electronic selection or confirmation mechanism) that allows the requestor to confirm the link between the local and remote information.

Features and advantages of the present disclosure include generating messages including additional information 312 to allow a requestor and approver, neither of whom may have an account or access to computer network 101 in FIG. 1, to interface with computer network 101 to complete an onboarding process for their organization, for example. In one embodiment, the message to the requestor comprises a session key, the messaging information for the user (e.g., the requestors email address), the role of the user (e.g., requestor), and the remote identification (RID2). In this example, the session key, the messaging information, the role, and RID2 are encrypted and not displayed to the first user. For instance, in one embodiment the session key, the messaging information, the role, and RID2 are encrypted in a universal resource locator (URL) selectable by the user (e.g., when the user selects confirmation button 311). Accordingly, in response to the requestor selecting the URL, the computer network 101 may be invoked to dynamically generate a web page, as illustrated at 320, and display the web page to the user (e.g., in an Internet browser). The web page may include the portion of the local and remote profile information, LID2, RID2, and a data entry box 321. Embodiments of the disclosure include prompting the user to enter the partial transaction number, which was received by computer network 101 in the OCM, to confirm the association between LID2 and RID2 and the associated local and remote profiles. When the requestor enters the correct partial transaction number, computer network 101 receives the first confirmation approving the association between the first local identification (LID2) and the first remote identification (RID2). In one embodiment, the session key may be valid for a limited time (e.g., 24 hours) and the system is configured to allow the requestor a maximum number of attempts to enter the partial transaction number (e.g., maximum of 3 tries).

FIG. 3 also illustrates a storage schema 352 for storing information for linking local identifications and remote identifications. When the incoming OCM is validated and processed, the system may store RID2 in a first data element 353 of schema 352. If the requestor enters the correct partial transaction number into data entry box 321, which triggers receipt of a confirmation, then the system may store a first designation of approval in a second data element 354 of schema 352. Storing the first designation of approval in data element 354 may also trigger OCM processor 302 to generate a second message to the approver, for example. Like the first message to the requestor, the second message to the approver may include the portion of the overlapping local and remote profile information (e.g., name, address, etc. . . . ), LID2, RID2, and other information, for example, to allow the approver to confirm that a particular local profile and LID2 should be linked to a particular remote profile and RID2. Hidden from the approver, the message may further include another session key, the messaging information for the user (e.g., the approvers email address), the role of the user (e.g., approver), and the remote identification (RID2) encrypted in a second universal resource locator (URL) selectable by the approver via a confirmation button, for example. In response to the approver selecting the second URL, the system dynamically generates a second web page comprising the portion of the local and remote profile information, LID2, RID2, and a data entry box.

The approver is prompted to enter the partial transaction number to confirm the association between LID2 and RID2 and the associated local and remote profiles. When the approver enters the correct partial transaction number, computer network 101 receives the second confirmation approving the association between the first local identification (LID2) and the first remote identification (RID2). As in the case for the requestor, in one embodiment, the session key may be valid for a limited time (e.g., 24 hours) and the system may be configured to allow the requestor a maximum number of attempts to enter the partial transaction number (e.g., maximum of 3 tries). If the approver enters the correct partial transaction number into data entry box, which triggers receipt of the second confirmation, then the system may store a second designation of approval in a third data element 355 of schema 352. Storing both the first and second designations of approval may trigger the system to store a third designation of completed approval in data element 356, for example, which in turn may cause the system to link RID2 to LID2. In one embodiment, the system may store LID2 in a fifth data element 357 of the schema 352 in response to storing the third designation. Accordingly, in one example embodiment, associating the LID2 and RID2 is based on the RID2 in the first data element 353 of schema 352 and LID2 in the fifth data element 356 of schema 352. It is to be understood that the above example technique for linking LID2 and RID2 is just one technique that may be used. A variety of the linking methods are also possible.

Figure 4:
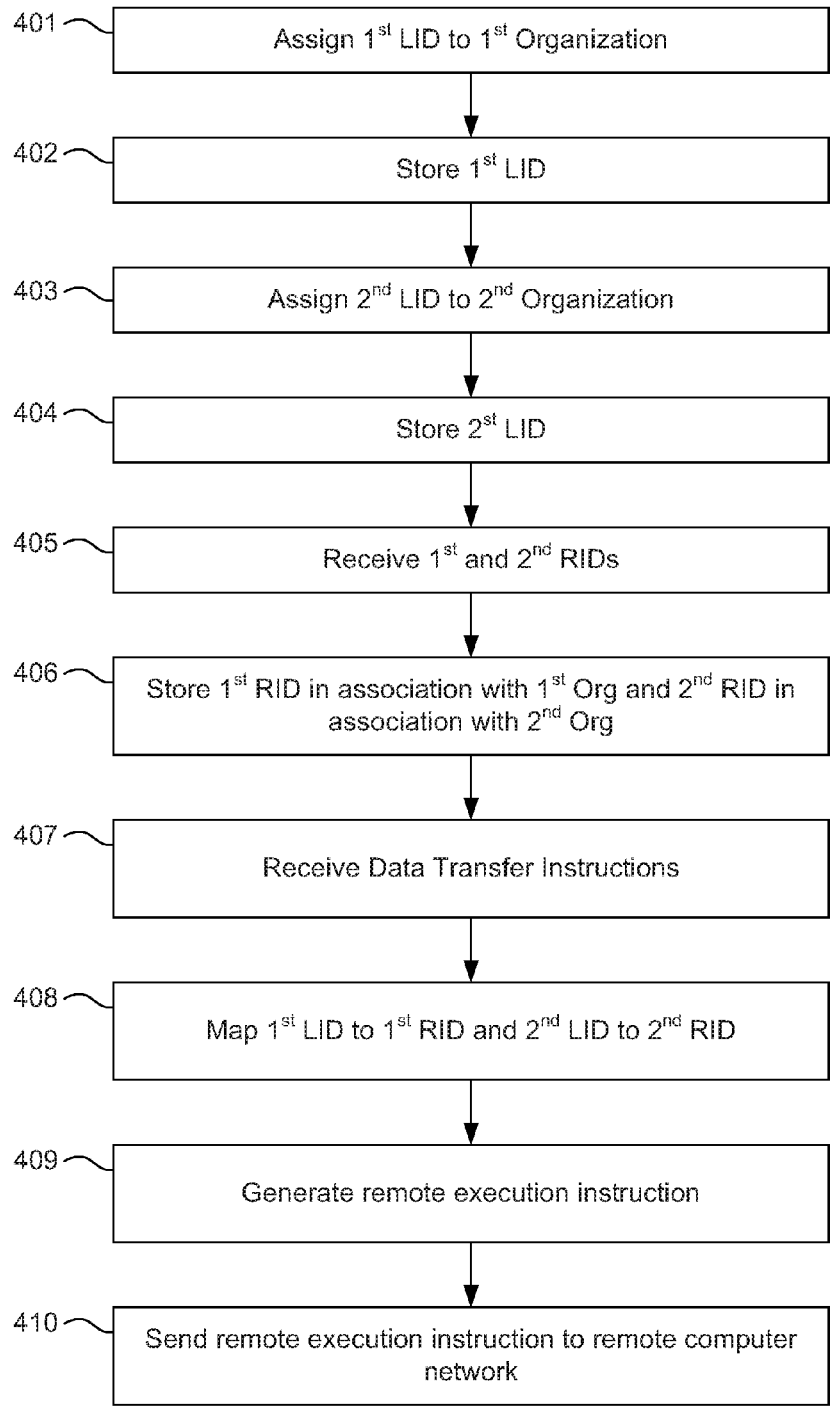
FIG. 4 illustrates a method for secure data transactions across disparate computer networks according to an embodiment.

FIG. 4 illustrates a method for secure data transactions across disparate computer networks according to an embodiment. The following process illustrates the data flow for the architecture described above in FIG. 1 and may be carried out on local computer network 101 operating on one or more computers. At 401, LID1 is assigned to a first organization (e.g., a buyer). At 402, LID is stored in the system in association with the first organization (e.g., in the same table or in a linked table). At 403, LID2 is assigned to a second organization (e.g., a supplier). At 404, LID2 is stored in the system in association with the second organization. At 405, first and second RIDs (RID1 and RID2) are received from a remote computer network. For example, RID1, a buyer proxy ID, may be received when a buyer registers with the remote computer network, and RID2, a merchant ID, may be received in the OCM described above. At 406, RID1 is stored in association with the first organization (e.g., the buyer) and RID2 is stored in association with the second organization (e.g., the supplier).

Features and advantages of the present disclosure include enabling secure data transactions between multiple parties across multiple distinct, independent computer networks, for example. Once the local and remote profiles, LIDs, and RIDs are configured as described above, for example, transactions may be initiated at 407, where a plurality of data transfer instructions (e.g., DT Instr 190 in FIG. 1) are received from a remote computer network (e.g., and ERP or financial system). The data transfer instructions may each include a local identification corresponding to the first organization (e.g., LID1), a local identification corresponding to the second organization (e.g., LID2), and information specifying a data transaction. The first organization (e.g., in one example, a supplier) may be a recipient of the data transfer instruction (e.g., a deposit transaction) and the second organization (e.g., in one example, a buyer) may be a source of the data transfer instruction (e.g., a withdrawal or debit transaction). The data transfer instructions may be received as a plurality of records each comprising a first field for a particular local identification corresponding to a particular organization (e.g., a particular supplier to be paid), a second field for another particular local identification corresponding to a different organization (e.g., to be debited), and a plurality of fields for the data transaction information. In one embodiment, the data transfer instruction may be a CSV file (comma separated values), for example, having a first field specifying local IDs for buyers, a second field specifying local IDs for suppliers, and remittance information (e.g., an amount to be transferred, invoice information, etc. . . . ).

In one embodiment, the local ID's (LIDs) received in the data transfer instructions are mapped to remote IDs (RIDs). For instance, at 408, LID1 is mapped to the RID1 and LID2 is mapped to RID2. At 409, a remote execution instruction is generated. The remote execution instruction may include RID1, RID2, and the information specifying the data transaction. In one example embodiment, the remote execution instruction is an extensible markup language (XML) document comprising a header and a body. The header includes RID1 and RID2, and the body includes the data transaction information. The XML document may be encrypted using a certificate of remote computer network 103 (e.g., a card network), and the remote computer network may decrypt the XML document using a private key, for example.

At 410, the remote execution instruction is sent to the remote computer network 103 in FIG. 1. The remote execution instruction causes the remote computer network to access another remote computer network 105 (e.g., a banking computer network) associated with the second organization (e.g., a buyer) using secure access information associated with RID2 to perform a sourcing operation (e.g., such as a debit operation). Additionally, the remote execution instruction causes the remote computer network to access yet another remote computer network 104 (e.g., a second banking computer network) associated with the first organization (e.g., a supplier) using secure access information associated with RID2 to perform a targeting operation (e.g., such as a deposit operation).

Figure 5:
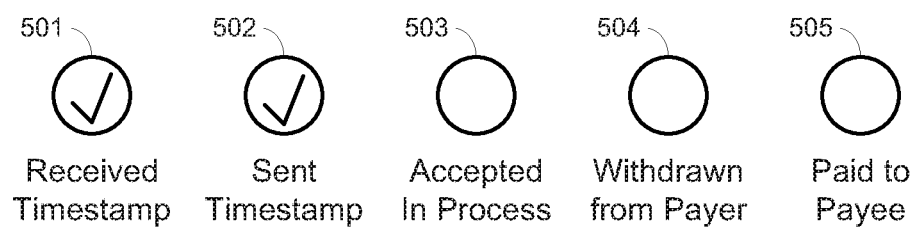
FIG. 5 illustrates a technique for tracking and tracing steps of a data transaction according to an embodiment.

FIG. 5 illustrates a technique for tracking and tracing steps of a data transaction according to an embodiment. FIG. 5 shows the display of a timeline to a user, where the timeline comprises a plurality of steps 501-505. Each step corresponds to a step in a data transaction process that is automatically updated to allow a user to track the progress of a data transaction. This example shows a payment data transaction process, for example. Each step corresponds to completion of a payment step according to the sequence described above. For example, first, an ERP system may send a payment data transfer instruction (a CSV file) to the local computer network. When the payment data transfer instruction is received in the local computer network, a first status may be stored in a table, for example, indicating completion of step 501. When the status is updated to a completed status, the change in status may be reflected in the display. In this example, an empty circle in the display may be replaced with a circle with a check mark at 501 together with text "received" and a time stamp for the date and time the step was completed.

Next, the remote execution instruction is generated, which may be a payment remittance cXML message in encrypted format and with a digital signature, for example. The cXML message is sent to the remote network 103 in FIG. 1, such as a card network, and a second status is stored indicating completion of step 502 and the display updated.

The card network, for example, receives the cXML remote execution instruction, validates it, and returns a confirmation of receipt (e.g., a payment remittance status update request). Accordingly, a third status is stored indicating completion of step 503. For example, a successful receipt may have a detailed status code (success: 2001, failure: 4XXX). The local network stores the status in the database and can show the track and trace displayed on the user interface in FIG. 5.

The remote network may then try to debit the buyer (a sourcing operation) with the payment amount and sends status code accordingly (success: 2002, failure: 5XXX). If successful, a fourth status is stored indicating completion of step 504.

The remote network may then credit the supplier bank account (a targeting operation) and sends status code accordingly (success: 2003, failure: 5XXX). Upon receipt of the confirmation of completion for the targeting operation, a fifth status is stored indicating completion of step 505.

The local network consumes these payment remittance status updates, and may store them in two tables, for example. The first table may be a remittance table storing remittance information including a remittance ID specifying a particular transaction and a status code. A second table may be an application log table storing a remittance ID, status code, and time stamp.

One issue that arises is that messages may be received out of order due to network traffic—e.g., a 4XXX message comes after 2003 message. The following logic may be included in the computer network software to detect an out of sequence condition. A message is out of sequence:

1. If current remittance status is paid, any new update is out of sequence. If current status is paying with 2001, if new status is failed with 4XXX, it's out of sequence.
2. If current status is paying with 2001, if new status is paying with 2001 (same status), it's out of sequence.
3. If current status is paying with 2002, if new status is failed (either 4XXX or 5XXX), it's out of sequence.
4. If current status is paying with 2002, if new status is paying with 2035, it's out of sequence.
5. If current status is paying with 2035, if new status is paying with 2001, it's out of sequence.
6. If current status is failed with 5XXX, any new update is out of sequence.
7. If current status is failed with 4XXX, 5XXX is out of sequence. For 5XXX to work, a 2001 has to be received.

For all out of sequence messages, an application log entry may be added to capture it so that it's visible to users (e.g., a supplier).

Hardware

Figure 6:
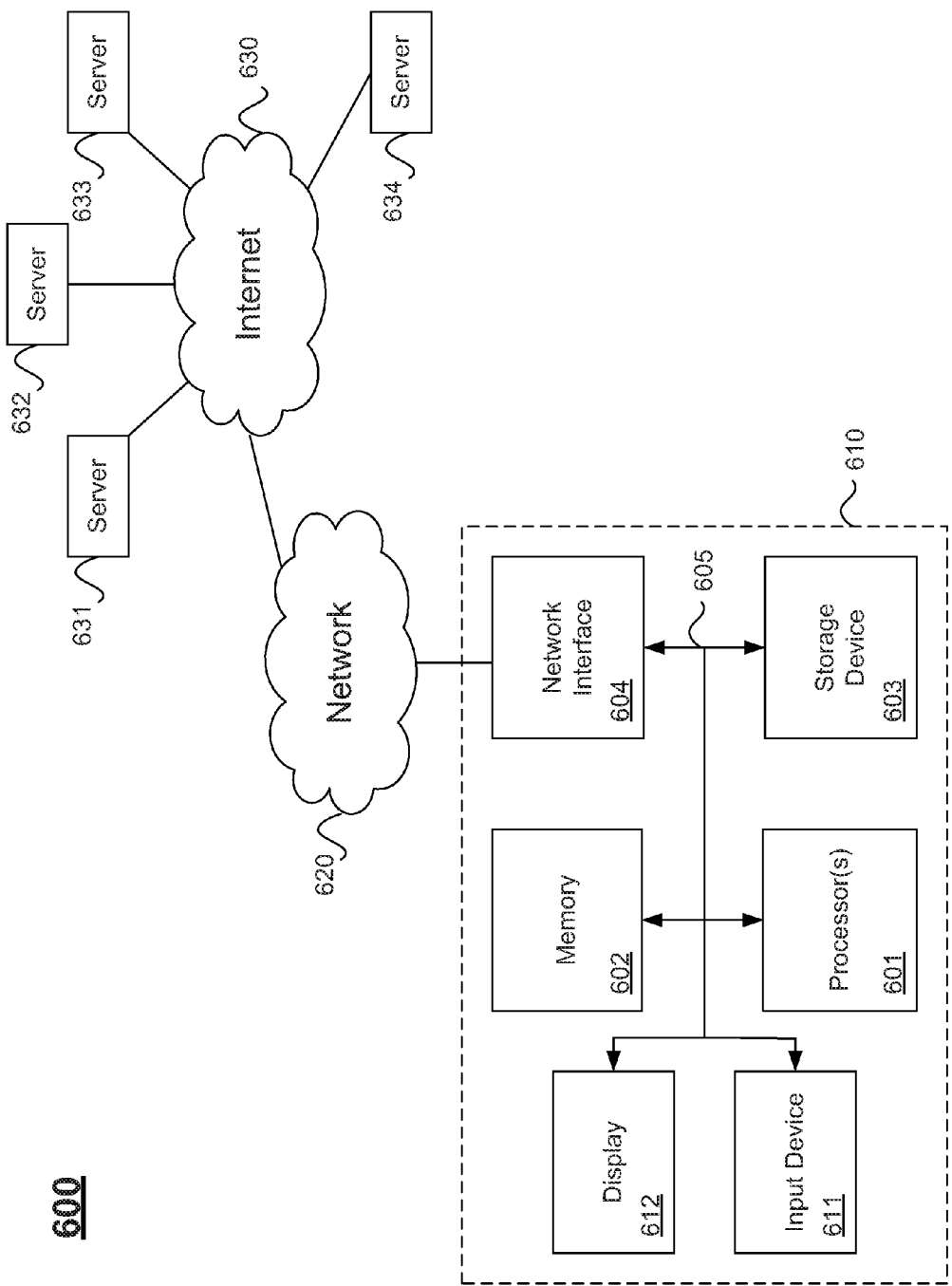
FIG. 6 illustrates hardware of a special purpose computing machine configured with a process according to the above disclosure.

FIG. 6 illustrates hardware of a special purpose computing machine configured with a process according to the above disclosure. The following hardware description is merely one example. It is to be understood that a variety of computers topologies may be used to implement the above described techniques. An example computer system 610 is illustrated in FIG. 6. Computer system 610 includes a bus 605 or other communication mechanism for communicating information, and one or more processor(s) 601 coupled with bus 605 for processing information. Computer system 610 also includes a memory 602 coupled to bus 605 for storing information and instructions to be executed by processor 601, including information and instructions for performing some of the techniques described above, for example. This memory may also be used for storing programs executed by processor(s) 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 603 may include source code, binary code, or software files for performing the techniques above, for example. Storage device and memory are both examples of non-transitory computer readable storage mediums.

Computer system 610 may be coupled via bus 605 to a display 612 for displaying information to a computer user. An input device 611 such as a keyboard, touchscreen, and/or mouse is coupled to bus 605 for communicating information and command selections from the user to processor 601. The combination of these components allows the user to communicate with the system. In some systems, bus 605 represents multiple specialized buses, for example.

Computer system 610 also includes a network interface 604 coupled with bus 605. Network interface 604 may provide two-way data communication between computer system 610 and a network 620. The network interface 604 may be a wireless or wired connection, for example. Computer system 610 can send and receive information through the network interface 604 across a local area network, an Intranet, a cellular network, or the Internet, for example. In the Internet example, a browser, for example, may access data and features on backend systems that may reside on multiple different hardware servers 631-634 across the network. Hardware servers 631-634 and The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method comprising:
assigning, by a local computer network, a first local identification to a first organization;
storing, by the local computer network, the first local identification in association with the first organization;
assigning, by the local computer network, a second local identification to a second organization;
storing, by the local computer network, the second local identification in association with the second organization;
sending, by a first remote card computer network, to the local computer network, a first remote identification and a second remote identification;
receiving, by the local computer network, from the first remote card computer network, the first remote identification and the second remote identification;
storing, by the local computer network, the first remote identification in association with the first organization and storing the second remote identification in association with the second organization;
receiving, by the local computer network, a data transfer instruction from an enterprise resource planning computer network, the data transfer instruction comprising the first local identification corresponding to the first organization, the second local identification corresponding to the second organization, and information specifying a first data transaction, wherein the first organization is a supplier in the first data transaction and the second organization is a buyer in the first data transaction;
mapping, by the local computer network, the first local identification in the data transfer instruction to the first remote identification and mapping the second local identification in the data transfer instruction to the second remote identification;
generating, by the local computer network, a remote execution instruction comprising the first remote identification, the second remote identification, and the information specifying the first data transaction;
sending, by the local computer network, the remote execution instruction to the first remote card computer network;
receiving, by the first remote card computer network the remote execution instruction;
accessing, by the first remote card computer network, in response to the remote execution instruction, a third remote banking computer network associated with the second organization using secure access information associated with the second remote identification to perform a debit operation on the third remote banking computer network; and
accessing, by the first remote card computer network, in response to the remote execution instruction, a fourth remote banking computer network associated with the first organization using secure access information associated with the first remote identification to perform a deposit operation on the fourth remote banking computer network.

2. The method of claim 1 wherein the data transfer instruction is received as one of a plurality of records each comprising a first field storing a local identification for organizations that are sources, a second field storing a local identification for organizations that are targets, and a plurality of fields for the information specifying the first data transaction.

3. The method of claim 2, wherein the plurality of records are received as comma separated values.

4. The method of claim 1 wherein the remote execution instruction is an extensible markup language (XML) document comprising a header and a body, the header comprising the first remote identification and the second remote identification, and the body comprising the information specifying the first data transaction.

5. The method of claim 4 wherein the XML document is encrypted using a certificate of the first remote computer network, and wherein the first remote computer network decrypts the XML document using a private key.

6. The method of claim 1 wherein the data transfer instruction describes a payment to a supplier corresponding to the first organization from a buyer corresponding to the second organization, wherein the first local identification is a local supplier identification, the second local identification is a local buyer identification, and the information specifying the first data transaction is remittance information describing the payment from the buyer to the supplier, and wherein the sourcing operation and targeting operation transfer payment from the buyer to the supplier.

7. The method of claim 1 wherein the first remote identification is stored separately from the first local identification on the local computer network, and wherein the first remote identification is not exposed to users of the local computer network.

8. The method of claim 1 further comprising:
displaying a timeline to a user, the timeline comprising a plurality of steps;
storing a first status when the data transfer instruction is received in the local computer network, and in accordance therewith, indicating completion of a first step in the timeline;
storing a second status when the remote execution instruction is sent to the first remote computer network, and in accordance therewith, indicating completion of a second step in the timeline;
storing a third status upon receipt, in the local computer network, of a confirmation of receipt of the remote execution instruction from the first remote computer network, and in accordance therewith, indicating completion of a third step in the timeline;
storing a fourth status upon receipt, in the local computer network, of a confirmation of completion of the debit operation from the first remote computer network, and in accordance therewith, indicating completion of a fourth step in the timeline; and
storing a fifth status upon receipt, in the local computer network, of a confirmation of completion of the deposit operation from the first remote computer network, and in accordance therewith, indicating completion of a fifth step in the timeline.

9. A plurality of non-transitory machine-readable mediums storing programs executable by a plurality of processing units, the programs comprising sets of instructions, which when executed, perform a method comprising:
assigning, by a local computer network, a first local identification to a first organization;
storing, by the local computer network, the first local identification in association with the first organization;
assigning, by the local computer network, a second local identification to a second organization;
storing, by the local computer network, the second local identification in association with the second organization;

sending, by a first remote card computer network, to the local computer network, a first remote identification and a second remote identification;

receiving, by the local computer network, from the first remote card computer network, the first remote identification and the second remote identification;

storing, by the local computer network, the first remote identification in association with the first organization and storing the second remote identification in association with the second organization;

receiving, by the local computer network, a data transfer instruction from an enterprise resource planning computer network, the data transfer instruction comprising the first local identification corresponding to the first organization, the second local identification corresponding to the second organization, and information specifying a first data transaction, wherein the first organization is a supplier in the first data transaction and the second organization is a buyer in the first data transaction;

mapping, by the local computer network, the first local identification in the data transfer instruction to the first remote identification and mapping the second local identification in the data transfer instruction to the second remote identification;

generating, by the local computer network, a remote execution instruction comprising the first remote identification, the second remote identification, and the information specifying the first data transaction;

sending, by the local computer network, the remote execution instruction to the first remote card computer network;

receiving, by the first remote card computer network, the remote execution instruction;

accessing, by the first remote card computer network, in response to the remote execution instruction, a third remote banking computer network associated with the second organization using secure access information associated with the second remote identification to perform a debit operation on the third remote banking computer network; and accessing, by the first remote card computer network, in response to the remote execution instruction, a fourth remote banking computer network associated with the first organization using secure access information associated with the first remote identification to perform a deposit operation on the fourth remote banking computer network.

10. The plurality of non-transitory machine-readable mediums of claim 9, wherein the data transfer instruction is received as one of a plurality of records each comprising a first field storing a local identification for organizations that are sources, a second field storing a local identification for organizations that are targets, and a plurality of fields for the information specifying the first data transaction.

11. The plurality of non-transitory machine-readable mediums of claim 10 wherein the plurality of records are received as comma separated values.

12. The plurality of non-transitory machine-readable mediums of claim 9, wherein the remote execution instruction is an extensible markup language (XML) document comprising a header and a body, the header comprising the first remote identification and the second remote identification, and the body comprising the information specifying the first data transaction.

13. The plurality of non-transitory machine-readable mediums of claim 12 wherein the XML document is encrypted using a certificate of the first remote computer network, and wherein the first remote computer network decrypts the XML document using a private key.

14. The plurality of non-transitory machine-readable mediums of claim 9, wherein the data transfer instruction describes a payment to a supplier corresponding to the first organization from a buyer corresponding to the second organization, wherein the first local identification is a local supplier identification, the second local identification is a local buyer identification, and the information specifying the first data transaction is remittance information describing the payment from the buyer to the supplier, and wherein the sourcing operation and targeting operation transfer payment from the buyer to the supplier.

15. The plurality of non-transitory machine-readable mediums of claim 9, wherein the first remote identification is stored separately from the first local identification on the local computer network, and wherein the first remote identification is not exposed to users of the local computer network.

16. The plurality of non-transitory machine-readable mediums of claim 9, further comprising:

displaying a timeline to a user, the timeline comprising a plurality of steps;

storing a first status when the data transfer instruction is received in the local computer network, and in accordance therewith, indicating completion of a first step in the timeline;

storing a second status when the remote execution instruction is sent to the first remote computer network, and in accordance therewith, indicating completion of a second step in the timeline;

storing a third status upon receipt, in the local computer network, of a confirmation of receipt of the remote execution instruction from the first remote computer network, and in accordance therewith, indicating completion of a third step in the timeline;

storing a fourth status upon receipt, in the local computer network, of a confirmation of completion of the debit operation from the first remote computer network, and in accordance therewith, indicating completion of a fourth step in the timeline; and storing a fifth status upon receipt, in the local computer network, of a confirmation of completion of the deposit operation from the first remote computer network, and in accordance therewith, indicating completion of a fifth step in the timeline.

17. A computer system comprising:

a plurality of processors;

a plurality of memories; and a plurality of software programs comprising instructions, executable on said plurality of processors, the software programs, when executed, performing a method comprising:

assigning, by a local computer network, a first local identification to a first organization;

storing, by the local computer network, the first local identification in association with the first organization;

assigning, by the local computer network, a second local identification to a second organization;

storing, by the local computer network, the second local identification in association with the second organization;

sending, by a first remote card computer network, to the local computer network, a first remote identification and a second remote identification;

receiving, by the local computer network, from the first remote card computer network, the first remote identification and the second remote identification;

storing, by the local computer network, the first remote identification in association with the first organization and storing the second remote identification in association with the second organization;

receiving, by the local computer network, a data transfer instruction from an enterprise resource planning computer network, the data transfer instruction comprising the first local identification corresponding to the first organization, the second local identification corresponding to the second organization, and information specifying a first data transaction, wherein the first organization is a supplier in the first data transaction and the second organization is a buyer in the first data transaction;

mapping, by the local computer network, the first local identification in the data transfer instruction to the first remote identification and mapping the second local identification in the data transfer instruction to the second remote identification;

generating, by the local computer network, a remote execution instruction comprising the first remote identification, the second remote identification, and the information specifying the first data transaction;

sending, by the local computer network, the remote execution instruction to the first remote card computer network;

receiving, by the first remote card computer network, the remote execution instruction;

accessing, by the first remote card computer network, in response to the remote execution instruction, a third remote banking computer network associated with the second organization using secure access information associated with the second remote identification to perform a debit operation on the third remote banking computer network; and accessing, by the first remote card computer network, in response to the remote execution instruction, a fourth remote computer banking network associated with the first organization using secure access information associated with the first remote identification to perform a deposit operation on the fourth remote banking computer network.

18. The computer system of claim 17 wherein the data transfer instruction is received as one of a plurality of records each comprising a first field storing a local identification for organizations that are sources, a second field storing a local identification for organizations that are targets, and a plurality of fields for the information specifying the first data transaction.

19. The computer system of claim 17 wherein the remote execution instruction is an extensible markup language (XML) document comprising a header and a body, the header comprising the first remote identification and the second remote identification, and the body comprising the information specifying the first data transaction.

20. The computer system of claim 17, the method further comprising:

displaying a timeline to a user, the timeline comprising a plurality of steps;

storing a first status when the data transfer instruction is received in the local computer network, and in accordance therewith, indicating completion of a first step in the timeline;

storing a second status when the remote execution instruction is sent to the first remote computer network, and in accordance therewith, indicating completion of a second step in the timeline;

storing a third status upon receipt, in the local computer network, of a confirmation of receipt of the remote execution instruction from the first remote computer network, and in accordance therewith, indicating completion of a third step in the timeline;

storing a fourth status upon receipt, in the local computer network, of a confirmation of completion of the debit operation from the first remote computer network, and in accordance therewith, indicating completion of a fourth step in the timeline; and storing a fifth status upon receipt, in the local computer network, of a confirmation of completion of the deposit operation from the first remote computer network, and in accordance therewith, indicating completion of a fifth step in the timeline.

\* \* \* \* \*